United States Patent
Desjardins et al.

(10) Patent No.: US 10,762,421 B2
(45) Date of Patent: Sep. 1, 2020

(54) WHITENED NEURAL NETWORK LAYERS

(71) Applicant: DeepMind Technologies Limited, London (GB)

(72) Inventors: Guillaume Desjardins, London (GB); Karen Simonyan, London (GB); Koray Kavukcuoglu, London (GB); Razvan Pascanu, Letchworth Garden City (GB)

(73) Assignee: DeepMind Technologies Limited, London (GB)

( * ) Notice: Subject to any disclaimer, the term of this patent is extended or adjusted under 35 U.S.C. 154(b) by 1111 days.

(21) Appl. No.: 15/174,020

(22) Filed: Jun. 6, 2016

(65) Prior Publication Data
US 2016/0358073 A1    Dec. 8, 2016

Related U.S. Application Data (60) Provisional application No. 62/172,009, filed on Jun. 5, 2015.

(51) Int. Cl.
*G06N 3/08* (2006.01)
*G06N 20/00* (2019.01)
*G06N 3/04* (2006.01)

(52) U.S. Cl.
CPC .......... *G06N 3/08* (2013.01); *G06N 3/04* (2013.01); *G06N 20/00* (2019.01); *G06N 3/084* (2013.01)

(58) Field of Classification Search
CPC ............ G06N 3/08; G06N 20/00; G06N 3/04; G06N 3/084
See application file for complete search history.

(56) References Cited

U.S. PATENT DOCUMENTS

| 5,490,236 A | 2/1996 | Niki | |
| 2015/0238148 A1* | 8/2015 | Georgescu | A61B 5/7267 600/408 |

OTHER PUBLICATIONS

Ioffe et al., "Batch Normalization: Accelerating Deep Network Training by Reducing Internal Covariate Shift", Mar. 2, 2015 (Year: 2015).*
Karhunen. "Neural Approaches to Independent Component Analysis and Source Separation," Proceedings of the 4th European Symposium on Artificial Neural Networks, Apr. 24, 1996, pp. 249-266.
Sohl-Dickstein. "The Natural Gradient by Analogy to Signal Whitening, and Recipes and Tricks for its Use," arXiv preprint arXiv, 2012, 1205.1828.

(Continued)

*Primary Examiner* — Daniel C Puentes
(74) *Attorney, Agent, or Firm* — Fish & Richardson P.C.

(57) ABSTRACT

Methods, systems, and apparatus, including computer programs encoded on computer storage media, for processing inputs using a neural network system that includes a whitened neural network layer. One of the methods includes receiving an input activation generated by a layer before the whitened neural network layer in the sequence; processing the received activation in accordance with a set of whitening parameters to generate a whitened activation; processing the whitened activation in accordance with a set of layer parameters to generate an output activation; and providing the output activation as input to a neural network layer after the whitened neural network layer in the sequence.

20 Claims, 3 Drawing Sheets

(56) References Cited

OTHER PUBLICATIONS

Desjardins et al. "Natural Neural Networks," Advances in Neural Information Processing Systems, 2015, pp. 2071-2079.
Leong et al. "Blind multiuser receiver for DS-CDMA wireless system," IEE Proceedings: Communications, Institution of Electrical Engineers, Oct. 2006, vol. 153, No. 5, pp. 733-739.
International Search Report and Written Opinion in International Application No. PCT/US2016/035901, dated Sep. 19, 2016, 114 pages.
Amari, "Natural Gradient Works Efficiently in Learning," (1998) [online] (retrieved from http://www.maths.tcd.ie/~mnl/store/Amari1998a.pdf), 29 pages.
Beck and Teboulle, "Mirror Descent and Nonlinear Projected Subgradient Methods for Convex Optimization," Operations Research Letters, 2003, 31:167-175.
Hinton et al., "Neural Networks for Machine Learning," Lectures 6a-e: Neural Networks for Machine Learning, (2012) [online] (retrieved from http://www.cs.toronto.edu/~tijmen/csc321/slides/lecture_slides_lec6.pdf), 31 pages.
Ioffe and Szegedy, "Batch Normalization: Accelerating Deep Network Training by Reducing Internal Covariate Shirt," (Mar. 2, 2015) [online] (retrieved from http://arxiv.org/pdf/1502.03167v3.pdf), 11 pages.
Martens, "Deep Learning via Hessian-free Optimization," In Proceedings of the 27th International Conference on Machine Learning, Haifa, Israel, 2010 [online] (retrieved from http://www.cs.toronto.edu/~jmartens/docs/Deep_HessianFree.pdf), 8 pages.
Martens and Grosse, "Optimizing Neural Networks with Kronecker-factored Approximate Curvature," (May 21, 2015) [online] (retrieved from https://arxiv.org/pdf/1503.05671v4.pdf), 54 pages.
Montavon and Müller, "Deep Boltzmann Machines and the Centering Trick," (2012) [online] (retrieved from http://gregoire.montavon.name/publications/montavon-lncs12.pdf), 18 pages.
Ollivier, "Riemannian Metrics for Neural Networks," (Mar. 4, 2013) [online] (retrieved from http://arxiv.org/pdf/1303.0818v1.pdf), 45 pages.
Pascanu and Bengio, "Revisiting Natural Gradient for Deep Networks," (Feb. 17, 2014) [online] (retrieved from http://arxiv.org/pdf/1301.3584v7.pdf), 18 pages.
Raiko et al., "Deep Learning Made Easier by Linear Transformations in Perceptrons," In Proceedings of the 15th International Conference on Artificial Intelligence and Statistics (AISTATS), 2012, La Palma, Canary Islands [online] (retrieved from http://jmlr.csail.mit.edu/proceedings/papers/v22/raiko12/raiko12.pdf), 9 pages.
EP Summons to attend oral proceedings pursuant to Rule 115(1) EPC in European Appln. No. 16730626.5, dated Mar. 6, 2020, 8 pages.
Bell et al., "The 'Independent Components' of Natural Scenes are Edge Filters," Vision Research, Jan. 1997, 37(23):3327-3338.

\* cited by examiner

WHITENED NEURAL NETWORK LAYERS

CROSS-REFERENCE TO RELATED APPLICATION

This application claims priority to U.S. Provisional Application No. 62/172,009, filed on Jun. 5, 2015. The disclosure of the prior application is considered part of and is incorporated by reference in the disclosure of this application.

BACKGROUND

This specification relates to processing inputs through the layers of neural networks to generate outputs.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

In general, one innovative aspect of the subject matter described in this specification can be embodied in a neural network system implemented by one or more computers that includes a whitened neural network layer is configured to: receive an input activation generated by a layer before the whitened neural network layer, process the received activation in accordance with a set of whitening parameters to generate a whitened activation, process the whitened activation in accordance with a set of layer parameters to generate an output activation, and provide the output activation as input to a neural network layer after the whitened neural network layer.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Particular embodiments of the subject matter described in this specification can be implemented so as to realize one or more of the following advantages. A whitened neural network layer as described in this specification can have a Fisher matrix that is constrained to be approximately the identity, allowing for stochastic gradient descent with respect to the layer parameters of the layer to be equivalent to natural gradient descent. In particular, the Fisher that is constrained is the Fisher of the objective function with respect to the parameters of the whitened neural layer. Thus, a neural network system that trains a neural network that includes one or more whitened neural network layers can leverage these properties of the Fisher to make constant progress over the course of the optimization, improving the effectiveness of the training process, i.e., by decreasing training time, improving the performance of the trained neural network model, or both. Additionally, by virtue of including the whitened neural network layers, the trained neural network can generalize better to previously unseen data than a trained neural network that does not include whitened neural network layers. By configuring the whitened neural network layer as described in this specification, the training process can remain as computationally efficient as or become more computationally efficient than training a neural network that does not include whitened neural network layers using state of the art techniques.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a neural network system implemented as computer programs on one or more computers in one or more locations that includes one or more whitened neural network layers.

Figure 1:
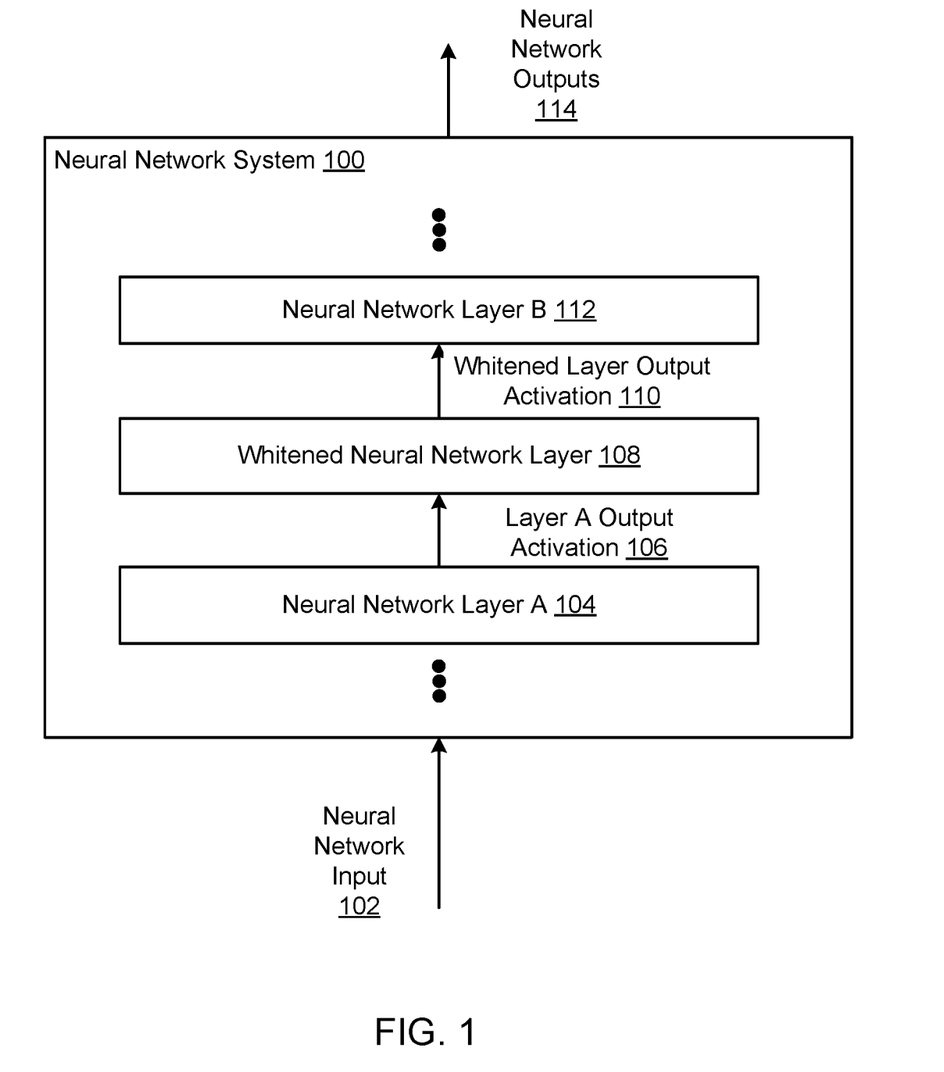
FIG. 1 shows an example neural network system.

FIG. 1 shows an example neural network system 100. The neural network system 100 is an example of a system implemented as computer programs on one or more computers in one or more locations, in which the systems, components, and techniques described below can be implemented.

The neural network system 100 includes multiple neural network layers that are arranged in a sequence from a lowest layer in the sequence to a highest layer in the sequence. The neural network system generates a neural network output 114 from a neural network input 102 by processing the neural network input 102 through each of the layers in the sequence.

The neural network system 100 can be configured to receive any kind of digital data input and to generate any kind of score or classification output based on the input.

For example, if the inputs to the neural network system 100 are images or features that have been extracted from images, the output generated by the neural network system 100 for a given image may be scores for each of a set of object categories, with each score representing an estimated likelihood that the image contains an image of an object belonging to the category.

As another example, if the inputs to the neural network system 100 are Internet resources (e.g., web pages), documents, or portions of documents or features extracted from Internet resources, documents, or portions of documents, the output generated by the neural network system 100 for a given Internet resource, document, or portion of a document may be a score for each of a set of topics, with each score representing an estimated likelihood that the Internet resource, document, or document portion is about the topic.

As another example, if the inputs to the neural network system 100 are features of an impression context for a particular advertisement, the output generated by the neural network system 100 may be a score that represents an estimated likelihood that the particular advertisement will be clicked on.

As another example, if the inputs to the neural network system 100 are features of a personalized recommendation for a user, e.g., features characterizing the context for the recommendation, e.g., features characterizing previous actions taken by the user, the output generated by the neural network system 100 may be a score for each of a set of content items, with each score representing an estimated likelihood that the user will respond favorably to being recommended the content item.

As another example, if the input to the neural network system 100 is text in one language, the output generated by the neural network system 100 may be a score for each of a set of pieces of text in another language, with each score representing an estimated likelihood that the piece of text in the other language is a proper translation of the input text into the other language.

As another example, if the input to the neural network system 100 is a spoken utterance, a sequence of spoken utterances, or features derived from one of the two, the output generated by the neural network system 100 may be a score for each of a set of pieces of text, each score representing an estimated likelihood that the piece of text is the correct transcript for the utterance or sequence of utterances.

As another example, the neural network system 100 can be part of an autocompletion system or part of a text processing system.

As another example, the neural network system 100 can be part of a reinforcement learning system and can generate outputs used for selecting actions to be performed by an agent interacting with an environment.

In particular, each of the layers of the neural network is configured to receive an input, i.e., the neural network input 102 or an output activation generated by another layer in the sequence, and generate an output activation from the input. The neural network layers collectively process neural network inputs received by the neural network system 100 to generate a respective neural network output for each received neural network input. Some or all of the neural network layers in the sequence generate outputs from inputs in accordance with current values of a set of parameters for the neural network layer. For example, some layers may multiply the received input by a matrix of current parameter values as part of generating an output from the received input.

Some or all of the layers in the sequence are whitened neural network layers. In the example of FIG. 1, the neural network system 100 includes a whitened neural network layer 108 between a neural network layer A 104 and a neural network layer B 112 in the sequence of neural network layers.

During the processing of the neural network input 102 by the neural network system 100, the whitened neural network layer 108 is configured to receive a layer A output activation 106 generated by the neural network layer A 104, process the layer A output activation 106 to generate a whitened neural network layer output activation 110, and then provide the whitened neural network layer output activation 110 as an input to the neural network layer B 112.

Generally, the whitened neural network layer 108 is configured to process the layer A output activation 106 in accordance with a set of whitening parameters to generate a whitened activation and then process the whitened activation in accordance with a set of layer parameters to generate the whitened neural network layer output activation 110. Processing an input activation to generate a whitened neural network layer output activation is described in more detail below with reference to FIG. 2.

Depending on the implementation, the neural network layer A 104 and the neural network layer B 112 may both be other whitened neural network layers, i.e., layers that also generate a whitened activation from an input to the layer before applying a set of layer parameters to the whitened activation, or one or both of the neural network layer A 104 and the neural network layer B 112 may be a different kind of neural network layer, e.g., a conventional convolutional or fully-connected layer.

Figure 2:
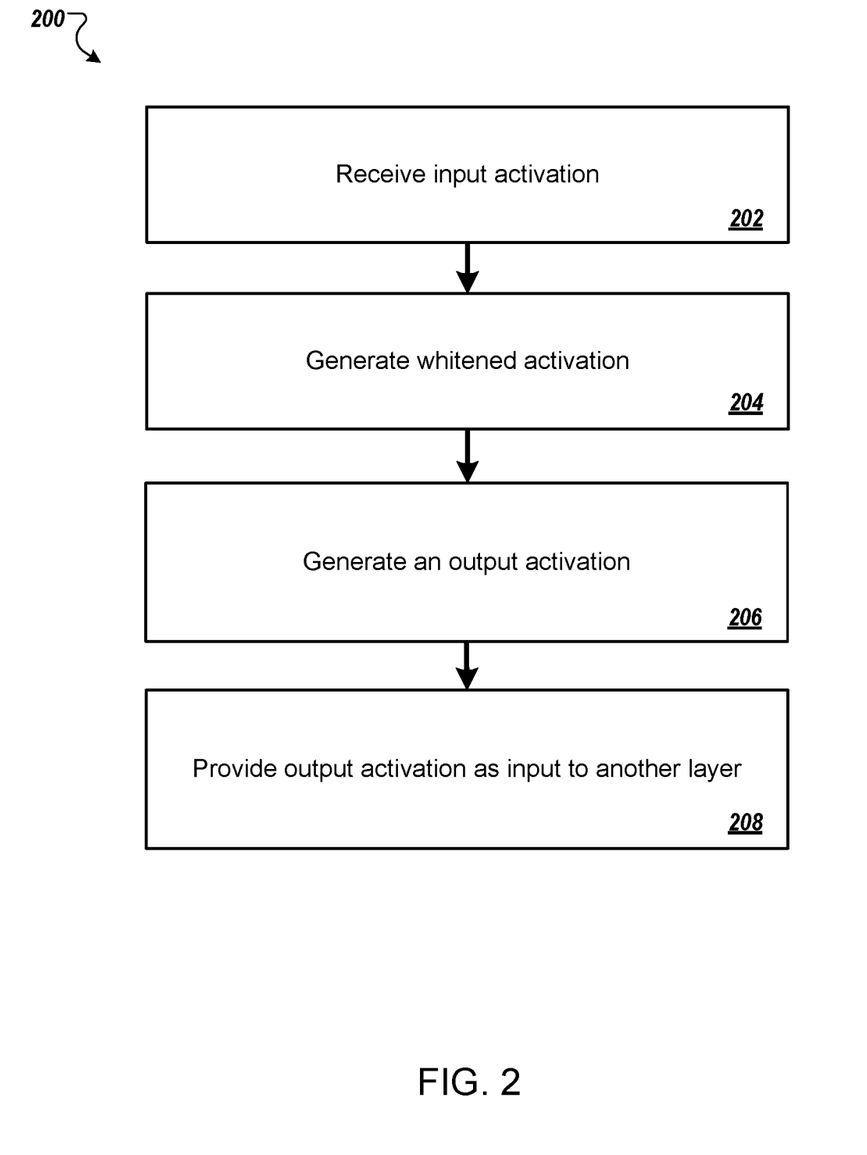
FIG. 2 is a flow diagram of an example process for processing an input activation using a whitened neural network layer.

FIG. 2 is a flow diagram of an example process 200 for processing an input activation using a whitened neural network layer. For convenience, the process 200 will be described as being performed by a system of one or more computers located in one or more locations. For example, a whitened neural network layer included in a neural network system, e.g., the whitened neural network layer 108 included in the neural network system 100 of FIG. 1, appropriately programmed, can perform the process 200.

The whitened neural network layer receives an input activation (step 202). The input activation is an activation generated by a layer before the whitened neural network layer in the sequence of layers.

The whitened neural network layer processes the input activation in accordance with a set of whitening parameters to generate a whitened activation (step 204). Generally, the whitened activation is a transformation of the input activation whose elements are approximately uncorrelated, i.e., the covariance matrix of the whitened activation is approximately the identity matrix. During training of the neural network, the whitening parameters are periodically adjusted as described below with reference to FIG. 3 to re-ensure that the elements are approximately uncorrelated.

In particular, the whitened neural network layer subtracts a mean parameter vector from the input activation to generate an intermediate whitened activation. Applying the mean parameter vector to the input activation ensures that the elements of the intermediate whitened activation each have approximately zero mean in expectation. Determining the values of the elements of the mean parameter vector is described below with reference to FIG. 3.

Figure 3:
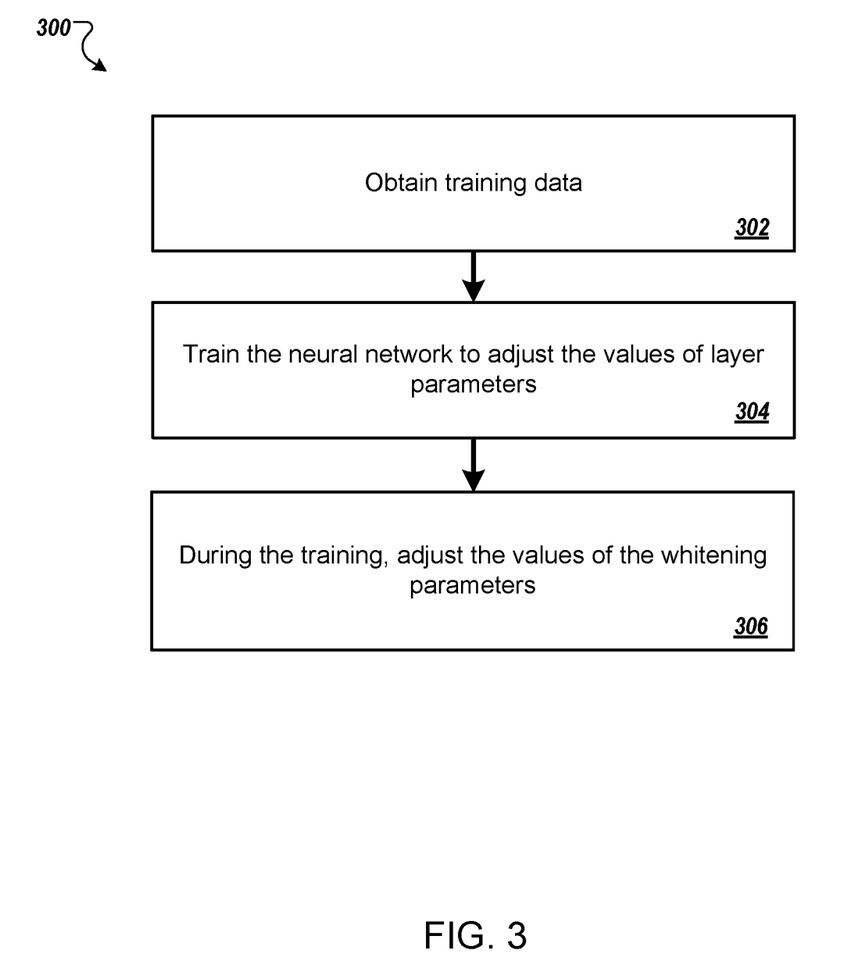
FIG. 3 is a flow diagram of an example process for training a neural network that includes a whitened neural network layer.

The whitened neural network layer then applies a whitening weight matrix to the intermediate whitened activation to generate the whitened activation. The whitening weight matrix is a matrix whose elements are derived based on eigenvalues of a matrix of the covariance of input activations, i.e., of output activations generated by the layer below the whitened neural network layer. For example, the whitening weight matrix may be the inverse square root of the covariance matrix. In some implementations, the whitening weight matrix may be represented as a PCA-whitening matrix whose rows are obtained from an eigen decomposition of the covariance matrix of the input activations. For example, if layer below the whitened neural network layer is a layer i in the sequence of layers, the whitening weight matrix U of the whitened neural network layer may satisfy:

$$U = \operatorname{diag}(\lambda_i + \varepsilon)^{-1/2} \cdot \tilde{U}_i^T,$$

where $\operatorname{diag}(\lambda_i + \varepsilon)^{-1/2}$ is a diagonal matrix that has values $(\lambda_i + \varepsilon)^{-1/2}$ along the diagonal, where $\lambda_i$ is a vector of eigenvalues of the covariance matrix, $\varepsilon$ is a hyper-parameter that serves as a regularization term, and $\tilde{U}_i^T$ is a matrix of the eigenvectors of the covariance matrix. Other decompositions of the covariance matrix are possible, however. Additionally, in some implementations, rather than decompose the covariance matrix, the values of the eigenvalues and the eigenvectors can be estimated directly, e.g., using a linear autoencoder. Determining the values of the elements of the whitening weight matrix is described below with reference to FIG. 3.

Thus, in some implementations, the operations performed by the whitened neural network layer to generate a whitened activation hw from an input activation $h_{i-1}$ satisfy:

$$h^w = U(h_{i-1} - c),$$

where c is the mean parameter vector and U is the whitening weight matrix.

The whitened neural network layer processes the whitened activation in accordance with a set of layer parameters to generate an output activation (step 206). For example, the layer parameters may include a bias vector d and a layer weight matrix V and the output activation h may satisfy:

$$h = f(Vh^w + d),$$

where $f$ is an element-wise non-linear activation function, e.g., inverse tangent or rectified linear unit.

The whitened neural network layer provides the output activation as input to a layer above the whitened neural network layer in the sequence (step 208).

The process 200 can be performed during the processing of a neural network input for which the desired output, i.e., the neural network output that should be generated by the neural network system for the input, is not known. The whitened neural network layer can also perform the process 200 during the processing of inputs in a set of training data, i.e., a set of inputs for which the output that should be predicted by the neural network system is known, in order to train the layers in the sequence, i.e., to determine trained values for the whitening parameters and the layer parameters of the whitened neural network layer and the parameters of the other neural network layers in the sequence. An example training process is described in more detail below with reference to FIG. 3.

FIG. 3 is a flow diagram of an example process 300 for training a neural network that includes at least one whitened neural network layer. For convenience, the process 300 will be described as being performed by a system of one or more computers located in one or more locations. For example, a neural network system, e.g., the neural network system 100 of FIG. 1, appropriately programmed, can perform the process 300.

The system obtains training data for training a neural network made up of a sequence of neural network layers that includes at least one whitened neural network layer (step 302). Generally, the training data includes multiple training inputs and a respective known output for each training input. The known output for a given training input is an output that should be generated by the neural network for the training input.

The system trains the neural network on the training data using a gradient descent technique to determine trained values of the layer parameters of the whitened neural network layer and trained values of parameters of the other neural network layers in the sequence (step 304).

That is, the system trains the neural network by optimizing an objective function using a gradient descent technique, e.g., stochastic gradient descent, to determine trained values of the layer parameters of any whitened neural network layers in the sequence and of the parameters of any other types of neural network layers in the sequence. In performing the gradient descent technique, the system treats the values of the whitening parameters of any whitened neural network layers as constant. Thus, the values of the whitening parameters are not learned via the optimization of the objective function, and are therefore constants from the point of view of the gradient descent technique.

During the training, the system repeatedly updates the values of the whitening parameters of the whitened neural network layers in the sequence (step 306). In particular, for each whitened neural network layer, rather than update the values of the whitening parameters of the layer as part of the gradient descent technique, the system updates the values of the whitening parameters using statistics of input activations generated by the layer before the whitened neural network layer in the sequence. In some implementations, after each time the system updates the values of the whitening parameters, the system also further adjusts the values of the set of layer parameters so that output activations generated by the whitened neural network layer remain unchanged.

In particular, the operations performed to update the whitening parameters and further update the layer parameters for a layer i can satisfy be expressed by the following pseudo-code:

Compute canonical parameters $W_i = V_i U_{i-1}$; $b_i = d_i + W_i c_i$.
Estimate $\mu_i$ and $\Sigma_i$, using $N_s$ samples from D.
Update $c_i$ from $\mu_i$ and $U_i$ from eigen decomp. of $\Sigma_i + \epsilon I$.
Update parameters $V_i \leftarrow W_i U_{i-1}^{-1}$; $c_i \leftarrow b_i - V_i c_i$.

By updating the layer parameters using the canonical parameters $W_i$, the overall function implemented remains unchanged, e.g. by preserving the product $V_i U_{i-1}$ before and after each update to the whitening coefficients (with an analogous constraint on the biases).

In some implementations, the system updates the values of the whitening parameters at specified intervals during the training. For example, the system may update the whitening parameters every T-th gradient descent update to the layer parameters, where T is an integer greater than one.

In these implementations, after every T-th gradient descent update during the training, the system samples a predetermined number of training inputs from the training data and processes the sampled training inputs using the neural network to generate neural network outputs in accordance with current values of the parameters of the neural network layers. The system then determines, for each whitened neural network layer an estimated covariance matrix of input activations generated by the layer before the whitened neural network layer by computing the covariance of the input activations generated by the layer before the whitened neural network layer during the processing of the sampled training inputs. The system also determines the estimated mean of the input activations generated by the layer before the whitened neural network layer by computing the mean of the input activations generated by the layer before the whitened neural network layer during the processing of the sampled training inputs.

The system derives updated values for the entries of the whitening weight matrix for the whitened neural network layer from the estimated covariance matrix, e.g., by performing an eigen decomposition as described above with reference to FIG. 2, and sets the updated mean parameter vector to be the estimated mean of the input activations.

In some other implementations, the system updates the whitening parameters online during the training process, i.e., updates the whitening parameters each time the layer parameters are updated. For example, the system can update the whitening parameters using a per-batch diagonal natural gradient update whose statistics are computed online.

In yet other implementations, the system updates the whitening parameters online by gradient descent of an auxiliary objective function, which, e.g., penalizes correlations in $h^w$, applies an auto-encoder reconstruction penalty per layer, or a loss whose minima corresponds to the whitening weight matrix.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A neural network system implemented by one or more computers and configured to receive a network input and to process the network input through each of a sequence of neural network layers to generate a network output from the network input, the sequence of neural network layers comprising:
  a whitened neural network layer, wherein the neural network layer is configured to perform operations comprising:
    receiving an input activation generated by a layer before the whitened neural network layer in the sequence;
    processing the received activation in accordance with a set of whitening parameters to generate a whitened activation;
    processing the whitened activation in accordance with a set of layer parameters to generate an output activation, wherein:
      the set of whitening parameters and the set of layer parameters have been determined during training of the neural network layers to adjust the whitening parameters and the layer parameters,
      the training comprises repeatedly (i) adjusting the values of the whitening parameters based at least in part on an eigen decomposition of a matrix of a covariance of input activations generated by the layer before the whitened neural network layer in the sequence and (ii) in response, adjusting the values of the set of layer parameters so that output activations generated by the whitened neural network layer remain unchanged; and
  providing the output activation as input to a neural network layer after the whitened neural network layer in the sequence.

2. The neural network system of claim 1, wherein the set of whitening parameters includes a mean parameter vector and a whitening weight matrix, and wherein processing the received activation in accordance with the set of whitening parameters to generate the whitened activation comprises:
  subtracting the mean parameter vector from the input activation to generate an intermediate whitened activation; and
  applying the whitening weight matrix to the intermediate whitened activation to generate the whitened activation.

3. The neural network system of claim 2, wherein the whitening weight matrix is a matrix having elements that are derived from the eigen decomposition of the matrix of the covariance of the input activations generated by the layer before the whitened neural network layer in the sequence.

4. The neural network system of claim 2, wherein the mean parameter vector is derived from a mean of the input activations generated by the layer before the whitened neural network layer in the sequence during the training.

5. The neural network system of claim 1, wherein the layer parameters comprise a bias vector d and a layer weight matrix V and the output activation h satisfies:

$$h = f(Vh^w + d),$$

wherein $f$ is an element-wise non-linear activation function and $h^w$ is the whitened activation.

6. One or more non-transitory computer storage media storing instructions that when executed by one or more computers cause the one or more computers to implement a neural network system that is configured to receive a network input and to process the network input through each of a sequence of neural network layers to generate a network output from the network input, the sequence of neural network layers comprising:
  a whitened neural network layer, wherein the neural network layer is configured to perform operations comprising:
    receiving an input activation generated by a layer before the whitened neural network layer in the sequence;
    processing the received activation in accordance with a set of whitening parameters to generate a whitened activation;
    processing the whitened activation in accordance with a set of layer parameters to generate an output activation, wherein:
      the set of whitening parameters and the set of layer parameters have been determined during training of the neural network layers to adjust the whitening parameters and the layer parameters,
      the training comprises repeatedly (i) adjusting the values of the whitening parameters based at least in part on an eigen decomposition of a matrix of a covariance of input activations generated by the layer before the whitened neural network layer in the sequence and (ii) in response, adjusting the values of the set of layer parameters so that output activations generated by the whitened neural network layer remain unchanged; and providing the output activation as input to a neural network layer after the whitened neural network layer in the sequence.

7. The computer storage media of claim 6, wherein the set of whitening parameters includes a mean parameter vector and a whitening weight matrix, and wherein processing the received activation in accordance with the set of whitening parameters to generate the whitened activation comprises:
   subtracting the mean parameter vector from the input activation to generate an intermediate whitened activation; and
   applying the whitening weight matrix to the intermediate whitened activation to generate the whitened activation.

8. The computer storage media of claim 7, wherein the whitening weight matrix is a matrix having elements that are derived from the eigen decomposition of the matrix of the covariance of the input activations generated by the layer before the whitened neural network layer in the sequence.

9. The computer storage media of claim 7, wherein the mean parameter vector is derived from a mean of the input activations generated by the layer before the whitened neural network layer in the sequence during the training.

10. The computer storage media of claim 6, wherein the layer parameters comprise a bias vector d and a layer weight matrix V and the output activation h satisfies:

$$h=f(Vh^w+d),$$

wherein $f$ is an element-wise non-linear activation function and $h^w$ is the whitened activation.

11. A method of training a neural network that is configured to receive a network input and to process the network input through each of a sequence of neural network layers to generate a network output from the network input,
   wherein the sequence of neural network layers comprises a whitened neural network layer,
   wherein the neural network layer is configured to receive an input activation generated by a layer before the whitened neural network layer in the sequence, process the received activation in accordance with a set of whitening parameters to generate a whitened activation, process the whitened activation in accordance with a set of layer parameters to generate an output activation, and provide the output activation as input to a neural network layer after the whitened neural network layer in the sequence, and wherein the method comprises:
   training the neural network on training data to adjust values of the set of layer parameters of the whitened neural network layer using a gradient descent technique; and
   during the training, (i) adjusting the values of the whitening parameters using an eigen decomposition of a matrix of an estimate of a covariance of input activations generated by the layer before the whitened neural network layer in the sequence and (ii) in response to adjusting the values of the whitening parameters, further adjusting the values of the set of layer parameters so that output activations generated by the whitened neural network layer remain unchanged.

12. The method of claim 11, wherein the whitening parameters comprise a whitening weight matrix and a mean parameter vector, and wherein adjusting the values of the whitening parameters comprises, during the training:
   adjusting the values of the whitening weight matrix based on the eigen decomposition of the matrix of the estimate of the covariance of input activations generated by the layer before the whitened neural network layer; and
   adjusting the values of the mean parameter vector based on an estimated mean of input activations generated by the layer before the whitened neural network layer.

13. The method of claim 11, wherein adjusting the values of the set of layer parameters of the whitened neural network layer using the gradient descent technique comprises treating the values of the whitening parameters as constants when updating the values of the set of layers parameters using the gradient descent technique.

14. The method of claim 11, wherein the layer parameters comprise a bias vector d and a layer weight matrix V and the output activation h satisfies:

$$h=f(Vh^w+d),$$

wherein $f$ is an element-wise non-linear activation function and $h^w$ is the whitened activation.

15. The method of claim 11, wherein adjusting the values of the whitening parameters comprises:
   determining that T gradient descent updates to the values of the layer parameters have occurred since a preceding update to the values of the whitening parameters.

16. A system for training a neural network that is configured to receive a network input and to process the network input through each of a sequence of neural network layers to generate a network output from the network input,
   wherein the sequence of neural network layers comprises a whitened neural network layer,
   wherein the neural network layer is configured to receive an input activation generated by a layer before the whitened neural network layer in the sequence, process the received activation in accordance with a set of whitening parameters to generate a whitened activation, process the whitened activation in accordance with a set of layer parameters to generate an output activation, and provide the output activation as input to a neural network layer after the whitened neural network layer in the sequence, and wherein the system comprises one or more computers and one or more storage devices storing instructions that when executed by one or more computers cause the one or more computers to perform operations comprising:
   training the neural network on training data to adjust values of the set of layer parameters of the whitened neural network layer using a gradient descent technique; and
   during the training, (i) adjusting the values of the whitening parameters using an eigen decomposition of a matrix of an estimate of a covariance of input activations generated by the layer before the whitened neural network layer in the sequence and (ii) in response to adjusting the values of the whitening parameters, further adjusting the values of the set of layer parameters so that output activations generated by the whitened neural network layer remain unchanged.

17. The system of claim 16, wherein the whitening parameters comprise a whitening weight matrix and a mean parameter vector, and wherein adjusting the values of the whitening parameters comprises, during the training:
   adjusting the values of the whitening weight matrix based on the eigen decomposition of the matrix of the estimate of the covariance of input activations generated by the layer before the whitened neural network layer; and adjusting the values of the mean parameter vector based on an estimated mean of input activations generated by the layer before the whitened neural network layer.

18. The system of claim 16, wherein adjusting the values of the set of layer parameters of the whitened neural network layer using the gradient descent technique comprises treating the values of the whitening parameters as constants when updating the values of the set of layers parameters using the gradient descent technique.

19. The system of claim 16, wherein adjusting the values of the whitening parameters comprises:
determining that T gradient descent updates to the values of the layer parameters have occurred since a preceding update to the values of the whitening parameters.

20. One or more non-transitory computer-readable storage media storing instructions that when executed by one or more computers cause the one or more computers to perform operations for training a neural network that is configured to receive a network input and to process the network input through each of a sequence of neural network layers to generate a network output from the network input,
wherein the sequence of neural network layers comprises a whitened neural network layer,
wherein the neural network layer is configured to receive an input activation generated by a layer before the whitened neural network layer in the sequence, process the received activation in accordance with a set of whitening parameters to generate a whitened activation, process the whitened activation in accordance with a set of layer parameters to generate an output activation, and provide the output activation as input to a neural network layer after the whitened neural network layer in the sequence, and wherein the operations comprise:
training the neural network on training data to adjust values of the set of layer parameters of the whitened neural network layer using a gradient descent technique; and
during the training, (i) adjusting the values of the whitening parameters using an eigen decomposition of a matrix of an estimate of a covariance of input activations generated by the layer before the whitened neural network layer in the sequence and (ii) in response to adjusting the values of the whitening parameters, further adjusting the values of the set of layer parameters so that output activations generated by the whitened neural network layer remain unchanged.

* * * * *